United States Patent
Quirk et al.

(10) Patent No.: US 6,545,103 B2
(45) Date of Patent: Apr. 8, 2003

(54) COMPOSITIONS PROVIDING IMPROVED FUNCTIONALIZATION OF TERMINAL ANIONS AND PROCESSES FOR IMPROVED FUNCTIONALIZATION OF TERMINAL ANIONS

(75) Inventors: Roderic Paul Quirk, Akron, OH (US); Young Joon Lee, Cuyahoga Falls, OH (US); James Anthony Schwindeman, Lincolnton, NC (US); Robert James Letchford, Cherryville, NC (US)

(73) Assignee: FMC Corporation, Philadelphia, PA (US)

( * ) Notice: Subject to any disclaimer, the term of this patent is extended or adjusted under 35 U.S.C. 154(b) by 0 days.

(21) Appl. No.: 09/897,562

(22) Filed: Jul. 2, 2001

(65) Prior Publication Data

US 2002/0010082 A1 Jan. 24, 2002

Related U.S. Application Data

(60) Division of application No. 09/301,535, filed on Apr. 28, 1999, which is a continuation-in-part of application No. 09/189,664, filed on Nov. 11, 1998, now abandoned.
(60) Provisional application No. 60/065,858, filed on Nov. 14, 1997.

(51) Int. Cl.$^7$ .................................................. C08F 8/34
(52) U.S. Cl. ................ 525/342; 525/332.8; 525/332.9; 525/331.1; 525/333.2; 525/343; 525/355; 525/359.1; 525/359.3
(58) Field of Search ............................... 525/342, 343, 525/355, 359.1, 359.3

(56) References Cited

U.S. PATENT DOCUMENTS

| | | |
|---|---|---|
| 3,377,404 A | 4/1968 | Zelinski |
| 3,764,760 A | 10/1973 | Marchini |
| 3,786,116 A | 1/1974 | Milkovich et al. |
| 4,409,357 A | 10/1983 | Milkovich |
| 5,362,699 A | 11/1994 | Shepherd et al. |
| 5,393,843 A | 2/1995 | Handlin, Jr. et al. |
| 5,405,911 A | 4/1995 | Handlin, Jr. et al. |
| 5,493,044 A | 2/1996 | Schwindeman |
| 5,496,940 A | 3/1996 | Lawson et al. |
| 5,521,309 A | 5/1996 | Antkowiak et al. |
| 5,523,364 A | 6/1996 | Engel et al. |
| 5,527,753 A | 6/1996 | Engel et al. |
| 5,565,526 A | 10/1996 | Schwindeman et al. |
| 5,567,815 A | 10/1996 | Hall et al. |
| 5,595,951 A | 1/1997 | Halasa et al. |
| 5,600,021 A | 2/1997 | Schwindeman et al. |
| 5,605,872 A | 2/1997 | Engel et al. |
| 5,620,939 A | 4/1997 | Halasa et al. |
| 5,621,149 A | 4/1997 | Schwindeman et al. |
| 5,708,092 A | 1/1998 | Schwindeman et al. |
| 5,736,617 A | 4/1998 | Kerns et al. |
| 5,785,778 A | 7/1998 | Lawson et al. |
| 5,786,441 A | 7/1998 | Lawson et al. |
| 5,821,307 A | 10/1998 | Schwindeman et al. |
| 5,827,929 A | 10/1998 | Schwindeman et al. |
| 5,906,956 A | 5/1999 | Halasa et al. |
| 5,910,547 A * | 6/1999 | Schwindeman et al. . 525/332.8 |
| 5,932,662 A | 8/1999 | Lawson et al. |

FOREIGN PATENT DOCUMENTS

| | | |
|---|---|---|
| FR | 1 554 878 | 1/1969 |
| WO | WO 90 09403 | 8/1990 |
| WO | WO 97 06192 | 2/1997 |
| WO | WO 97/16465 | 5/1997 |
| WO | WO 98 02465 | 1/1998 |

OTHER PUBLICATIONS

HL Hsieh: "Anionic Polymerization: Principles and Practical Applications", 1996, M Dekker, New York, pp. 261, 262,265 and 306.

* cited by examiner

Primary Examiner—Bernard Lipman
(74) Attorney, Agent, or Firm—Myers Bigel Sibley & Sajovec, PA

(57) ABSTRACT

Compositions including one or more anionic polymerization initiators and one or more additives for improving functionalizing efficiency of living polymer anions are disclosed. The present invention also provides compositions including one or more electrophiles and one or more additives for improving functionalizing efficiency of living polymer anions. Novel electrophiles and processes for improving polymer anion functionalization efficiencies are also disclosed.

4 Claims, No Drawings

COMPOSITIONS PROVIDING IMPROVED FUNCTIONALIZATION OF TERMINAL ANIONS AND PROCESSES FOR IMPROVED FUNCTIONALIZATION OF TERMINAL ANIONS

CROSS REFERENCE TO RELATED APPLICATIONS

This application is a divisional application of pending application Ser. No. 09/301,535, filed Apr. 28, 1999, which is a continuation-in-part application of pending application Ser. No. 09/189,664, filed Nov. 11, 1998, now abandoned, incorporated by reference in its entirety, which is related to copending Provisional Application Ser. No. 60/065,858, filed Nov. 14, 1997, incorporated by reference in its entirety, and claims the benefit of its filing date under 35 USC Section 119e).

FIELD OF THE INVENTION

This invention relates to novel compositions of an anionic polymerization initiator and an additive which enhance functionalization of living polymer anions; novel compositions of electrophiles and an additive which enhance functionalization of living polymer anions; and processes which employ these compositions, or an additive, for improved efficiency in the functionalization of living polymer anions.

BACKGROUND OF THE INVENTION

Polymers that contain terminal functional groups are industrially important. One technique to prepare these terminally functionalized polymers is by reaction of a suitable electrophile with a living polymer anion. For numerous examples of end group functionalization chemistry, see Hsieh, H. L.; Quirk, R. P. *Anionic Polymerization: Principles and Practical Applications*; Marcel Dekker: New York, N.Y., 1996, pages 261–306.

Some of these functionalization reactions are not very efficient, particularly for the preparation of telechelic polymers, due to the formation of a thick gel during the functionalization. This leads to lower capping efficiency. See, for example, U.S. Pat. No. 5,393,843, Example 1, wherein the capping efficiency was only 82%.

A recently reported terminal functionalization technique uses a protected functionalized electrophile. For instance, Nakahama and co-workers have described the reaction of polystyryllithium with the electrophile Br—$(CH_2)_3$C$(OCH_3)_3$, a protected carboxyl group. See Hirao, A.; Nagahama, H. Ishizone, T.; Nakahama, S. *Macromolecules*, 1993, 26, 2145. Excellent terminal functionalization of the living anion was achieved (>95%). Other examples of efficient functionalization with protected functionalized electrophiles are reported in Ueda, K.; Hirao, A.; S. Nakahama, S. *Macromolecules*, 1990, 23, 939; Tohyarna, M.; Hirao, A.; Nakahama, S. *Macromol. Chem. Phys.* 1996, 197, 3135, and Labeau, M. P.; Cramail, H.; Deffieux, A. *Polymer International*, 1996, 41, 453.

To obtain efficient functionalization, these functionalization reactions are conducted in tetrahydrofuran (THF) at −80° C. THF, however, is an expensive solvent, and these low-temperature conditions are not practical on an industrial scale. In addition, efficient functionalization of polymer anions was only observed with expensive alkyl bromides.

SUMMARY OF THE INVENTION

The present invention provides compositions capable of increasing efficiencies in the functionalization of living polymer anions. The compositions include as a component one or more additives, such as an alkali halide or alkali alkoxide. The inventors have unexpectedly found that the additives are capable of improving the efficiency of reactions between polymer anions and electrophiles, as compared to similar reactions in the absence of an additive. In one aspect of the invention, the compositions include one or more additives and one or more anionic polymerization initiators. Exemplary anionic polymerization initiators include non-functionalized and functionalized organoalkali metal initiators. In another aspect of the invention, the compositions include one or more additives and one or more electrophiles useful for functionalizing living polymers.

Processes for improving living polymer anion functionalization are also provided. In this aspect of the invention, a living polymer anion is functionalized using a suitable electrophile in the presence of one or more additives as described above. Higher yields of functionalized polymers were observed when the additive was employed. In addition, the employment of the additive allowed the functionalization to be performed in hydrocarbon solvent at room temperature. Further, these reaction conditions are much less expensive on a commercial scale, as compared to the prior art. The invention can also be used with a variety of monomers and/or functionalizing agents. For example, it was discovered that the less expensive, and more readily available, alkyl chlorides afford efficient functionalization when an additive is employed.

Yet another embodiment of the invention provides novel electrophiles. The novel electrophiles have the formula

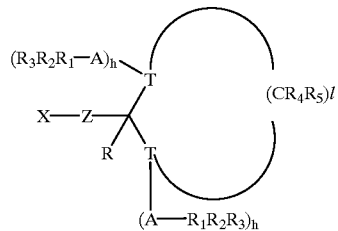

wherein:
X is halogen selected from chloride, bromide and iodide;
Z is a branched or straight chain hydrocarbon connecting group which contains 1–25 carbon atoms, optionally substituted with aryl or substituted aryl;
T is selected from the group consisting of oxygen, sulfur, nitrogen, and mixtures thereof;
(A—$R_1R_2R_3$) is a protecting group, in which A is an element selected from Group IVa of the Periodic Table of the Elements and $R_1$, $R_2$, and $R_3$ are each independently selected from the group consisting of hydrogen, alkyl, substituted alkyl, aryl, substituted aryl, cycloalkyl, and substituted cycloalkyl;
R, $R_4$, and $R_5$ are each independently selected from the group consisting of hydrogen, alkyl, substituted alkyl, aryl, substituted aryl, cycloalkyl, and substituted cycloalkyl;
h is 0 when T is oxygen or sulfur, and 1 when T is nitrogen; and
l is an integer from 1 to 7.

DETAILED DESCRIPTION OF THE INVENTION

Additives useful in the invention include, but are not limited to, alkali halides, such as lithium chloride, lithium bromide, lithium iodide, sodium chloride, sodium iodide, potassium chloride, and mixtures thereof; alkali alkoxides, such as lithium t-butoxide, lithium s-butoxide, potassium t-butoxide, and mixtures thereof; and the like and mixtures thereof. The additives should be dried, prior to use.

Several factors influence the amount of additive required, such as the nature of the polymer anion; the identity of the hydrocarbon solvent; the presence of a polar additive (co-solvent); the amount of the polar additive; the nature of the electrophile; and the identity of the additive. An effective amount of the additive employed is from as little as 0.01 equivalents of the electrophile, up to greater than five equivalents again based on the electrophile. In general, less than ten equivalents of the additive are effective for increasing the efficiency of the functionalization reaction.

In one aspect of the invention, the compositions can include one or more organoalkali metal anionic polymerization initiators. Exemplary anionic polymerization initiators include alkyllithium initiatiors represented by the formula R'-Li, wherein R' represents an aliphatic, cycloaliphatic, or arylsubstituted aliphatic radical. Preferably, R' is an alkyl or substituted alkyl group of 1–12 carbon atoms. Such initiators include, but are not limited to, methyllithium, ethyllithium, n-propyllithium, 2-propyllithium, n-butyllithium, s-butyllithium, t-butyllithium, n-hexyllithium, 2-ethylhexyllithium, and the like and mixtures thereof. As used herein, alkyllithium initiators also include dilithium initiators as known in the art. See, for example, U.S. Pat. Nos. 5,393,843 and 5,405,911. Dilithium initiators can be prepared by the reaction of an alkyllithium reagent, such as s-butyllithium, with a compound having at least two independently polymerizable vinyl groups, such as the isomeric divinylbenzenes or isomeric diisopropenylbenzenes.

One or more functionalized organoalkali metal initiators may also be employed in the compositions of the invention. These functionalized initiators have the general structure shown below:

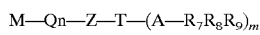

(I)

or

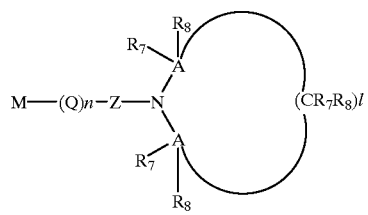

(II)

wherein:
M is an alkali metal selected from the group consisting of lithium, sodium and potassium;
Q is an unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—Z linkage;
n is an integer from 0 to 5;
Z is a branched or straight chain hydrocarbon connecting group which contains 3–25 carbon atoms, optionally substituted with aryl or substituted aryl;

T is selected from the group consisting of oxygen, sulfur, and nitrogen groups and mixtures thereof;
$(A-R_7R_8R_9)_m$ is a protecting group in which A is an element selected from Group IVa of the Periodic Table of the Elements, and $R_7$, $R_8$, and $R_9$ are each independently selected from the group consisting of hydrogen, alkyl, substituted alkyl, aryl, substituted aryl, cycloalkyl, and substituted cycloalkyl;
l is an integer from 1 to 7; and
m is 1 when T is oxygen or sulfur, and 2 when T is nitrogen.

As used herein, the term "alkyl" refers to straight chain and branched C1–C25 alkyl. The term "substituted alkyl" refers to C1–C25 alkyl substituted with one or more lower C1–C10 alkyl lower alkoxy, lower alkylthio, or lower dialkylamino. The term "cycloalkyl" refers to C3–C12 cycloalkyl. The term "substituted cycloalkyl" refers to C3–C12 cycloalkyl substituted with one or more lower C1–C10 alkyl lower alkoxy, lower alkylthio, or lower dialkylamino. The term "aryl" refers to C5–C25 aryl having one or more aromatic rings, each of 5 or 6 carbon atoms. Multiple aryl rings may be fused, as in naphthyl or unfused, as in biphenyl. The term "substituted aryl" refers to C5–C25 aryl substituted with one or more lower C1–C10 alkyl, lower alkoxy, lower alkylthio, or lower dialkylamino. Exemplary aryl and substituted aryl groups include, for example, phenyl, benzyl, and the like.

U.S. Pat. 5,496,940 and 5,527,753 disclose novel, tertiary amino initiators which are soluble in hydrocarbon solvents. These initiators, useful in practicing this invention, are derived from omega-tertiary-amino-1-haloalkanes of the following general structures:

and

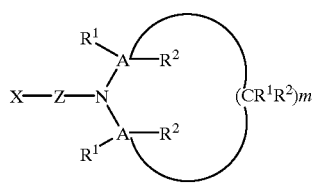

wherein X is defined as a halogen, preferably chlorine or bromine; Z is defined as a branched or straight chain hydrocarbon connecting group which contains 3–25 carbon atoms; A is an element selected from Group IVa of the Periodic Table of the Elements, $R^1$, $R^2$ and $R^3$ are independently defined as hydrogen, alkyl, substituted alkyl groups containing lower alkyl, lower alkylthio, and lower dialkylamnino groups, aryl or substituted aryl groups containing lower alkyl, lower alkylthio, and lower dialkylamino groups, or cycloalkyl and substituted cycloalkyl groups containing 5 to 12 carbon atoms, and m is an integer from 1 to 7. The process reacts selected omega-tertiary-amino-1-haloalkanes whose alkyl groups contain 3 to 25 carbon atoms, with lithium metal at a temperature between about 35° C. and about 130° C., preferably at the reflux temperature of an alkane, cycloalkane, or aromatic reaction solvent containing 5 to 10 carbon atoms and mixtures of such solvents.

Tertiary amino-1-haloalkanes useful in the practice of this invention include, but are not limited to, 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-diethylamino)-2-methyl-1-propyl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(2,2,5,5-tetramethyl-2,5-disila-1-azacyclopentane)-1-propyl halide, 4-(2,2,5,5-tetramethyl-2,5-disila-1-azacyclopentane)-1-butyl halide, 6-(2,2,5,5-tetramethyl-2,5-disila-1-azacyclopentane)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is selected from chlorine and bromine.

U.S. Pat. No. 5,600,021 discloses novel monofunctional ether initiators which are soluble in hydrocarbon solvents. These initiators, useful in practicing this invention, are derived from omega-protected-hydroxy-1-haloalkanes of the following general structure:

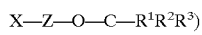

X—Z—O—C—R$^1$R$^2$R$^3$)

wherein X is defined as a halogen, preferably chlorine or bromine; Z is a branched or straight chain hydrocarbon group which contains 3–25 carbon atoms, R$^1$, R$^2$ and R$^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane, or aromatic reaction solvent containing 5 to 10 carbon atoms and mixtures of such solvents.

The precursor omega-protected-1-haloalkanes (halides) were prepared from the corresponding haloalcohol by the standard literature methods. For example, 3-(1,1-dimethylethoxy)-1-chloropropane was synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5:893, which involved the reaction of the appropriate alcohol with 2-methyl-2-butene catalyzed by boron trifluoride etherate is employed for the preparation of the t-amyl ethers. The alkoxy, alkylthio or dialkylamino substituted ethers, for example 6-[3-(methylthio)-1-propyloxy]-1-chlorohexane, were synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, were synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, are prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accord with this earlier process useful in practicing this invention can include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-dimethyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino]-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is selected from chlorine and bromine.

U.S. Pat. No. 5,362,699 discloses novel monofunctional silyl ether initiators which are soluble in hydrocarbon solvents. These initiators, useful in practicing this invention, are derived from omega-silyl-protected-hydroxy-1-haloalkanes of the following general structure:

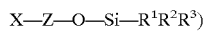

X—Z—O—Si—R$^1$R$^2$R$^3$)

wherein X is defined as a halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40° C., in an alkane, cycloalkane or aromatic reaction solvent containing 5 to 10 carbon atoms and mixtures of such solvents.

t-Butyldimethylsilyl protected compounds, for example 4-(t-butyldimethylsilyloxy)-1-butylhalide, are prepared from t-butyldimethylchlorosilane, and the corresponding halo-alcohol, according to the method described in U.S. Pat. No. 5,493,044. Omega-silyloxy-1-haloalkanes prepared in accord with this earlier process useful in practicing this invention can include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 6-(t-butyldimethylsilyloxy)-1-hexyl halide, and 3-(trimethylsilyloxy)-2,2-dimethyl-1-propyl halide. The halo- or halide group is selected from chlorine and bromine.

Monofunctional thioether initiators useful in the practice of this invention are derived from omega-protected-thio-1-haloalkanes of the following general structure:

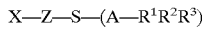

X—Z—S—(A—$R^1R^2R^3$)

wherein X is defined as a halogen, preferably chlorine or bromine; Z is a branched or straight chain hydrocarbon group which contains 3–25 carbon atoms; (A—$R^1R^2R^3$) is a protecting group in which A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms. The process reacts selected omega-thioprotected-1-haloalkyls whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

The initiator precursor, omega-thio-protected-1-haloalkanes (halides), are prepared from the corresponding halothiol by the standard literature methods. For example, 3-(1,1-dimethylethylthio)-1-propylchloride is synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involved the reaction of the appropriate thiol with 2-methyl-2-butene catalyzed by boron trifluoride etherate is employed for the preparation of the t-amyl thioethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, are prepared by the reaction of the omega-chloro-thiol with bromochloromethane, methanol, and potassium hydroxide, by the method of F. D. Toste and I. W. J. Still, Synlett, 1995, 159. t-Butyldimethylsilyl protected compounds, for example 4-(t-butyldimethylsilylthio)-1-butylhalide, are prepared from t-butyldimethylchlorosilane, and the corresponding thiol, according to the method described in U.S. Pat. No. 5,493,044.

Omega-thio-protected 1-haloalkanes prepared in accord with this earlier process useful in practicing this invention can include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1-dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is selected from chlorine and bromine.

Functionalized organoalkali metal initiators of the following structures may also be employed in the compositions of the invention:

(VII)

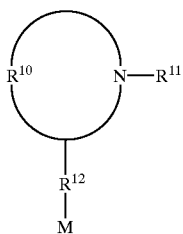

(VIII)

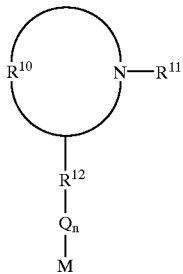

wherein:

M is an alkali metal;

$R^{10}$ is chiral or achiral and is selected from the group consisting of saturated and unsaturated, linear and branched, optionally silyl-, amino-, or oxy-substituted, C3–C16 alkyl; and saturated and unsaturated, linear and branched, C3–C16 alkyl containing saturated or unsaturated lower alkyl, aryl, or substituted aryl;

$R^{11}$ is chiral or achiral and is selected from the group consisting of saturated and unsaturated, linear and branched, optionally silyl-, amino-, or oxy-substituted, C1–C16 alkyl; saturated and unsaturated, optionally silyl-, amino-, or oxy-substituted, C3–C16 cycloalkyl; saturated and unsaturated, linear and branched, substituted C1–C16 alkyl containing saturated or unsaturated lower alkyl, aryl, or substituted aryl; and saturated and unsaturated substituted C3–C16 cycloalkyl containing saturated or unsaturated lower alkyl, aryl, or substituted aryl;

$R^{12}$ is a hydrocarbon connecting group or tether selected from the group consisting of saturated and unsaturated, linear and branched C1–C25 alkyl; saturated and unsaturated C3—C25 cycloalkyl; saturated and unsaturated substituted C1–C25 alkyl containing saturated or unsaturated lower alkyl, aryl, or substituted aryl; and saturated and unsaturated substituted C3–C25 cycloalkyl containing saturated or unsaturated lower alkyl, aryl, or substituted aryl, with the proviso that the nitrogen atom and the alkali metal are separated by three or more carbon atoms;

Q is a saturated or unsaturated hydrocarbyl group derived by incorporation of one or more conjugated diene hydrocarbons, one or more alkenylsubstituted aromatic compounds, or mixtures of one or more dienes with one or more alkenylsubstituted aromatic compounds into the M—$R^{12}$ linkage; and n is an integer from 1 to 5. See pending U.S. application Ser. No. 09/139,222, filed Aug. 24, 1998, the entire disclosure of which is hereby incorporated by reference.

The tertiary amino initiators of this invention are prepared by reaction of selected tertiary amino halides, such as described in structure (IX), with an alkali metal selected from lithium, sodium and potassium, for example at a temperature ranging from about 35 to 130° C., advantageously at an elevated temperature (>40° C.), in a hydrocarbon solvent containing five to ten carbon atoms and mixtures of such solvents to form an alkylorganometallic compound containing a tertiary amine.

(IX)

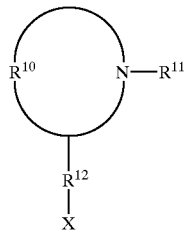

wherein:

X is halogen selected from the group consisting of chlorine, bromine and iodine; and $R^{10}$, $R^{11}$, and $R^{12}$ are as defined above. These halides are commercially available or can be prepared using techniques known in the art.

Examples of tertiary amino halides useful in the practicing this invention include, but are not limited to, 2-(2-chloroethyl)-N-methylpiperidine, 2-(2-chloroethyl)-N-ethylpiperidine, 2-(2-chloroethyl)-N-propylpiperidine, 2-(2-chloroethyl)-N-methylpyrrolidine, 2-(2-chloroethyl)-N-ethylpyrrolidine, 3-(chloromethyl)-N-methylpiperidine, 3-(chloromethyl)-N-ethylpiperidine, 4-(2-chloroethyl)-N-methylpiperidine, 4-(2-chloroethyl)-N-ethylpiperidine, 4-(2-chloroethyl)-N-propylpiperidine, 4-(chloromethyl)-N-methylpiperidine, 4-(chloromethyl)-N-ethylpiperidine, 4-(chloromethyl)-N-propylpiperidine, 2-(2-chloroethyl)-N-methylhexarnethyleneimine, 2-(2-chloroethyl)-N-methylmorpholine, and mixtures thereof.

The chain extended compounds of structure (VIII) can have greater solubility in hydrocarbon solution than the compounds described in structure (VII). For example, the solubility of 2-(2-lithioethyl)-N-methyl-piperidine in cyclohexane solution was about 6 weight percent. However, when this same material was chain extended with two equivalents of isoprene, the solubility increased to over 28 weight percent. Similar increases in solubility were observed for other chain extended analogues.

The initiators described in structure (VIII) are prepared by reacting an organometallic compound of the formula described in structure (VII) wherein M, $R^{10}$, $R^{11}$, and $R^{12}$ have the meanings ascribed above, with one or more conjugated diene hydrocarbons, one or more alkenylsubstituted aromatic compounds, or mixtures of one or more dienes with one or more alkenylsubstituted aromatic compounds, to form an extended hydrocarbon chain between M and $R^{12}$ in structure (VIII), which extended chain is denoted as $Q_n$ in structure (VIII). The compounds of structure (VIII) are prepared by first reacting in an inert solvent a selected tertiary amino halide (structure (IX)) with an alkali metal at a temperature ranging from about 35° C. to about 130° C., advantageously at a temperature above about 40° C., to afford an organometallic compound of structure (VII), which is then optionally reacted with a one or more conjugated diene hydrocarbons, one or more alkenylsubstituted aromatic compounds, or mixtures of one or more dienes with one or more alkenylsubstituted aromatic compounds, in a predominantly alkane, cycloalkane, or aromatic reaction solvent, which solvent contains 5 to 10 carbon atoms, and mixtures of such solvents to produce an initiator with an extended chain or tether between the metal atom (M) and $R^{12}$ in structure (VIII) above and mixtures thereof with compounds of structure (VII).

Incorporation of Q groups into the M—$R^{12}$ linkage to form the compounds of structure (VIII) above involves addition of compounds of structure (VII) across the carbon to carbon double bonds in compounds selected from the consisting of one or more conjugated diene hydrocarbons, one or more alkenylsubstituted aromatic compounds, or mixtures of one or more dienes with one or more alkenyl-substituted aromatic compounds to produce new carbon-lithium bonds of an allylic or benzylic nature, similar to those found in a propagating polyalkadiene or polyaryleth-ylene polymer chain derived by anionic initiation of the polymerization of conjugated dienes or arylethylenes. These new carbon-lithium bonds are now "activated" toward polymerization and so are much more efficient in promoting polymerization than the precursor M—$R^{12}$ (M=Li) bonds themselves.

In another aspect of the invention, the compositions include one or more additives and one or more electrophiles. The electrophiles can, for example, include one or more functionalized alkyl halides (electrophiles). Co-pending U.S. patent application Ser. Nos. 08/872,895, 08/873,220, and 08/893,951, incorporated herein by reference, detail the synthesis of telechelic and functionalized star polymers by the reaction of living polymer anions with electrophiles of the following general structure:

or

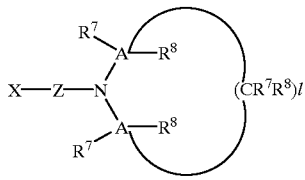

wherein:
- X is halogen selected from the group consisting of chloride, bromide and iodide;
- Z is a branched or straight chain hydrocarbon connecting group which contains 1–25 carbon atoms, optionally containing aryl or substituted aryl groups;
- T is selected from the group consisting of oxygen, sulfur, and nitrogen groups and mixtures thereof;
- (A—$R^7R^8R^9$)$_m$ is a protecting group in which A is an element selected from Group IVa of the Periodic Table of the Elements, and $R^7$, $R^8$, and $R^9$ are each independently selected from the group consisting of hydrogen, alkyl, substituted alkyl, aryl, substituted aryl, cycloalkyl, and substituted cycloalkyl;
- m is 1 when T is oxygen or sulfur, and 2 when T is nitrogen; and
- l is an integer from 1 to 7.

Examples of electrophiles of this class include, but are not limited to, 3-(N,N-dimethylamino)-1-chloropropane, 3-(N,N-dimethylamino)-1-bromopropane, 3-(N,N-dimethylamino)-2-methyl-1-chloropropane, 3-(N,N-dimethylamino)-2,2-dimethyl-1-chloropropane, 4-(N,N-dimethylamino)-1-chlorobutane, 5-(N,N-dimethylamino)-1-chloropentane, 3-(N,N-diethylamino)-2-methyl-1-chloropropane, 3-(N-ethyl-N-methylamino)-1-chloropropane, 6-(N,N-dimethylamino)-1-chlorohexane, 3-(N,N-diethylamino)-1-chloropropane, 3-(N,N-diethylamino)-2,2-dimethyl-1-chloropropane, 4-(N,N-diethylamino)-1-chlorobutane, 5-(N,N-diethylarnino)-1-chloropentane, 6-(N,N-diethylamino)-1-chlorohexane, 3-(N-ethyl-N-methylamino)-2-methyl-1-chloropropane, 3-(N-ethyl-N-methylamino)-2,2-dimethyl-1-chloropropane, 4-(N-ethyl-N-methylamino)-1-chlorobutane, 5-(N-ethyl-N-methylamino)-1-chloropentane, 6-(N-ethyl-N-methylamino)-1-chlorohexane, 3-(piperidino)-1-chloropropane, 3-(piperidino)-2-methyl-1-chloropropane, 3-(piperidino)-2,2-dimethyl-1-chloropropane, 4-(piperidino)-1-chlorobutane, 5-(piperidino)-1-chloropentane, 6-(piperidino)-1-chlorohexane, 3-(pyrrolidino)-1-chloropropane, 3-(pyrrolidino)-2-methyl-1-chloropropane, 3-(pyrrolidino)-2,2-dimethyl-1-chloropropane, 4-(pyrrolidino)-1-chlorobutane, 5-(pyrrolidino)-1-chloropentane, 6-(pyrrolidino)-1-chlorohexane, 3-(hexamethyleneimino)-1-chloropropane, 3-(hexamethyleneimino)-2-methyl-1-chloropropane, 3-(hexamethyleneimino)-2,2-dimethyl-1-chloropropane, 4-(hexamethyleneimino)-1-chlorobutane, 5-(hexamethyleneimino)-1-chloropentane, 6-(hexamethyleneimino)-1-chlorohexane, 3-(2,2,5,5-tetramethyl-2,5-disila-1-azacyclopentane)-1-chloropropane, 4-(2,2,5,5-tetramethyl-2,5-disila-1-azacyclopentane)-1-chlorobutane, 6-(2,2,5,5-tetramethyl-2,5-disila-1-azacyclopentane)-1-chlorohexane, 3-(N-isopropyl-N-methyl)-1-chloropropane, 2-(N-isopropyl-N-methyl)-2-methyl-1-chloropropane, 3-(N-isopropyl-N-methyl)-2,2-dimethyl-1-chloropropane, 4-(N-isopropyl-N-methyl)-1-chlorobutane, 3-(1,1-dimethylethoxy)-1-chloropropane, 3-(1,1-dimethylethoxy)-1-bromopropane, 3-(1,1-dimethylethoxy)-2-methyl-1-chloropropane, 3-(1,1-dimethylethoxy)-2,2-dimethyl-1-chloropropane, 4-(1,1-dimethylethoxy)-1-chlorobutane, 5-(1,1-dimethylethoxy)-1-chloropentane, 6-(1,1-dimethylethoxy)-1-chlorohexane, 8-(1,1-dimethylethoxy)-1-chlorooctane, 3-(1,1-dimethylpropoxy)-1-chloropropane, 3-(1,1-dimethylpropoxy)-2-methyl-1-choropropane, 3-(1,1-dimethylpropoxy)-2,2-dimethyl-1-chlorpropane, 3-(t-butyldimethylsilyloxy)-1-chloropropane, 3-(t-butyldimethylsilyloxy)-2-methyl-1-chloropropane, 3-(t-butyldimethylsilyloxy)-2,2-dimethyl-1-chloropropane, 4-(t-butyldimethylsilyloxy)-1-chlorobutane, 4-(t-butyldimethylsilyloxy)-1-iodobutane, 5-(t-butyldimethylsilyloxy)-1-chloropentane, 6-(t-butyldimethylsilyloxy)-1-chlorohexane, 8-(t-butyldimethylsilyloxy)-1-chlorooctane, 3-(t-butyldiphenylylsilyloxy)-1-chloropropane, 3-(t-butyldiphenylylsilyloxy)-2-methyl-1-chloropropane, 3-(t-butyldiphenylylsilyloxy)-2,2-dimethyl-1-chloropropane, 6-(t-butyldimethylsilyloxy)-1-chlorohexane, 3-(triethylsilyloxy)-2,2-dimethyl-1-chloropropane, 3-(trimethylsilyloxy)-2,2-dimethyl-1-bromopropane and 3-(trimethylsilyloxy)-2,2-dimethyl-1-chloropropane, 3-(methylthio)-1-chloropropane, 3-(methylthio)-1-bromopropane, 3-(methylthio)-2-methyl-1-chloropropane, 3-(methylthio)-2,2-dimethyl-1-chloropropane, 4-(methylthio)-1-chlorobutane, 5-(methylthio)-1-chloropentane, 6-(methylthio)-1-chlorohexane, 8-(methylthio)-1-chlorooctane, 3-(methoxymethylthio)-1-chloropropane, 3-(methoxymethylthio)-2-methyl-1-chloropropane, 3-(methoxymethylthio)-2,2-dimethyl-1-chloropropane, 4-(methoxymethylthio)-1-chlorobutane, 5-(methoxymethylthio)-1-chloropentane, 3-(1,1-dimethylpropylthio)-1-chloropropane, 3-(1,1-dimethylpropylthio)-2-methyl-1-chloropropane, and 3-(t-butyldimethylsilylthio)-1-chloropropane.

Functionalizing agents, or electrophiles, of the formula X—Z—T—(A—R$^7$R$^8$R$^9$)$_m$ or

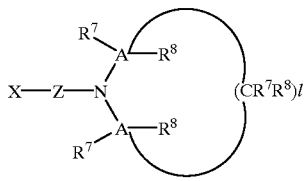

can be prepared as described, for example, in International Publication WO 97/16465. In addition, the electrophiles can be prepared as described in K. Ueda, A. Hirao, and S. Nakahama, Macromolecules, 23, 939 (1990); U.S. Pat. No. 5,496,940; U.S. Pat. No. 5,600,021; U.S. Pat. No. 5,362,699; A. Alexakis, M. Gardette, and S. Colin, Tetrahedron Letters, 29, 1988, 2951; B. Figadere, X. Franck, and A. Cave, Tetrahedron Letters, 34, 1993, 5893; J. Almena, F. Foubelo, and M. Yus, Tetrahedron, 51, 1995, 11883; D. F. Taberand Y. Wang, J. Org. Chem., 58, 1993, 6470; F. D. Toste and I. W. J. Still, Synlett, 1995, 159; and U.S. Pat. No. 5,493,044.

Additional electrophiles that are useful in the practice of this invention include:

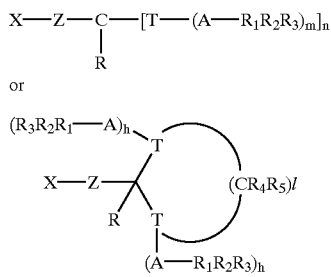

(IV)

wherein:

X is a halogen selected from chloride, bromide and iodide;

Z is a branched or straight chain hydrocarbon connecting group which contains 1–25 carbon atoms, optionally substituted with aryl or substituted aryl;

T is selected from the group consisting of oxygen, sulfur, nitrogen, and mixtures thereof;

(A—R$_1$R$_2$R$_3$) is a protecting group, in which A is an element selected from Group IVa of the Periodic Table of the Elements and R$_1$, R$_2$, and R$_3$ are each independently selected form the group consisting of hydrogen, alkyl, substituted alkyl, aryl, substituted aryl, cycloalkyl, and substituted cycloalkyl;

R, R$_4$, and R$_5$ are each independently selected from the group consisting of hydrogen, alkyl, substituted alkyl, aryl, substituted aryl, cycloalkyl, and substituted cycloalkyl;

h is 0 when T is oxygen or sulfur, and 1 when T is nitrogen;

1 is an integer from 1 to 7;

m is 1 when T is oxygen or sulfur, and 2 when T is nitrogen; and n is 2 or 3.

Examples of electrophiles of this class include, but are not limited to, trimethyl 4-bromoorthobutyrate, trimethyl 3-chloroorthopropionate, 5-chloro-2-pentanone ethylene ketal, triethyl 5-chloroorthopentanoate, N-3-chloropropyl-2,2,5,5-tetramethyl-2,5-disila-1-azapentane, and the like and mixtures thereof.

These electrophiles can be prepared by standard literature procedures. For example, triethyl ortho-3-chloropropionate can be prepared from 3-chloroprionitrile by the method of G. Casy, J. W. Patterson, and R. J. K. Taylor, Org. Syn. Coll. Vol. 8, 415 (1993). Substituted dimethyl or diethyl dithio acetals and ketals can be prepared from the corresponding halo aldehydes or halo ketones and methylthiol or ethylthiol and HCl catalyst, as described by H. Zinner, Chem. Ber., 83, 275 (1980). Halo substituted 1,3-dithianes can be synthesized from the corresponding halo carbonyl compound, 1,3-propanedithiol, and boron trifluoride etherate catalyst, as detailed by J. A. Marshall and J. L. Belletire, Tetrahedron Letters, 871 (1971). Analogously, halo substituted 1,3-dithiolanes can be synthesized from the corresponding halo carbonyl compound, 1,3-ethanedithiol, and boron trifluoride etherate catalyst, as detailed by R. P. Hatch, J. Shringarpure, and S. M. Weinreb, J Org. Chem., 43, 4172 (1978). Substituted dimethyl or diethyl acetals and ketals can be prepared from the corresponding halo aldehydes or halo ketones and methanol or ethanol and anhydrous HCl catalyst, as described by A. F. B. Cameron, J. S. Hunt, J. F. Oughton, P. A. Wilkinson, and B. M. Wilson, J Chem. Soc., 3864 (1953). The method of R. A. Daignault and E. L. Eliel, Org. Syn. Col. Vol. V, 303, (1973), which involves the reaction of a halo-substituted aldehyde or ketone with ethylene glycol, with paratolunesulfonic acid catalyst and azeotropic removal of water, can be employed to prepare the corresponding halo-substituted 1,3-dioxolane. Halo-substituted 1,3-dioxanes can be prepared from the corresponding halo aldehyde or ketone, 1,3-propanediol, paratoluenesulfonic acid catalyst, with azeotropic removal of water, see J. E. Cole, W. S. Johnson, P. A. Robins, and J. Walker, J Chem. Soc., 244 (1962), and H. Okawara, H. Nakai, and M. Ohno, Tetrahedron Letters, 23, 1087 (1982). The reaction of 2-mercaptoethanol with a halo-substituted aldehyde or ketone, with zinc chloride catalyst affords the commensurate substituted 1,3-oxathiolane, as reported by J. Romo, G. Rosenkranz, and C. Djerassi, J Amer. Chem. Soc., 73, 4961 (1951) and V. K. Yadav and A. G. Fallis, Tetrahedron Letters, 29, 897 (1988). Substituted oxazolidines can be synthesized from the corresponding aminoalcohol and a halo-substituted aldehyde or ketone, see E. P. Goldberg and H. R. Nace, J Amer. Chem. Soc., 77, 359 (1955). In a similar fashion, the method of A. J. Carpenter and D. J. Chadwick, Tetrahedron, 41, 3803 (1985) can be employed to generate N,N'-dimethylimidazolidines from a halo aldehyde or ketone and N,N'-dimethyl-1,2-ethylenediamine. Higher homologs can be prepared from the parent halo-substituted imidazolidine via dialkylation, see J. C. Craig and R. J. Young, Org. Syn. Coll. Vol. V, 88 (1973). N-3-Chloropropyl-2,2,5,5-tetramethyl-2,5-disila-1-azapentane can be prepared by the reaction of 3-chloropropylamine and 1,1,4,4-tetramethyl-1,4-dichloro-disilethylene and an acid acceptor, see S. Djuric, J. Venit, and P. Magnus, Tetrahedron Letters, 22, 1787 (1981).

An additional class of electrophile that is useful in the practice of this invention is described by the general formula:

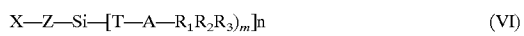

X—Z—Si—[T—A—R$_1$R$_2$R$_3$)$_m$]n    (VI)

wherein:
X is halogen selected from the group consisting of chloride, bromide and iodide;
Z is a branched or straight chain hydrocarbon connecting group which contains 1–25 carbon atoms, optionally substituted with aryl or substituted aryl;
T is selected from the group consisting of oxygen, sulfur, and nitrogen groups and mixtures thereof;
A is an element selected from Group IVa of the Periodic Table of the Elements;
$R_1$, $R_2$, and $R_3$ are each independently selected from the group consisting of hydrogen, alkyl, substituted alkyl, aryl, substituted aryl, cycloalkyl, and substituted cycloalkyl;
m is 1 when T is oxygen or sulfur, and 2 when T is nitrogen; and
n is 2 or 3.

Examples of electrophiles of this class include, but are not limited to, 3-chloropropyltrimethoxysilane, chloromethyltriethoxysilane, 4-chlorobutyltrimethoxysilane, 3-chloropropyl-tris (dimethylamino)silane, and the like and mixtures thereof.

An additional class of electrophile that is useful in the practice of this invention is described by the general formula:

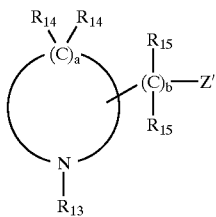

wherein:
Z' is a halogen atom;
$R_{13}$ is selected from the group consisting of organic groups containing from 1 to about 12 carbon atoms and a bridging bond;
each $R_{14}$ is independently selected from the group consisting of hydrogen, organic groups containing from 1 to about 12 carbon atoms and a bridging bond;
each $R_{15}$ is independently selected from the group consisting of hydrogen, organic groups containing from 1 to about 12 carbon atoms;
a is an integer from 4 to about 16; and
b is an integer from 0 to about 12.
See U.S. Pat. No. 5,736,617.

Other compounds useful in functionalizing polymeric living polymers include, but are not limited to, alkylene oxides, such as ethylene oxide, propylene oxide, styrene oxide, and oxetane; oxygen; sulfur; carbon dioxide; halogens such as chlorine, bromine and iodine; propargyl halides; alkenylhalosilanes and omega-alkenylarylhalosilanes, such as styrenyldimethyl chlorosilane; sulfonated compounds, such as 1,3-propane sultone; amides, including cyclic amides, such as caprolactam, N-benzylidene trimethylsilylamide, and dimethyl form amide; silicon acetals; 1,5-diazabicyclo[3.1.0]hexane; allyl halides, such as allyl bromide and allyl chloride; methacryloyl chloride; amines, including primary, secondary, tertiary and cyclic amines, such as 3-(dimethylamino)-propyl chloride and N-(benzylidene)trimethylsilylamine; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357, the entire disclosure of each of which is incorporated herein by reference.

The impact of the additive was initially studied in the functionalization reaction of poly(styryl)lithium. The living polymer anion was treated with 1.5 molar equivalents of 3-(N,N-dimethylamino)-1-chloropropane (Examples 1 and 2). The degree of functionalization was determined by end group titration. The results, tabulated below, indicate that the efficiency of the functionalization reaction increased by approximately 40% by the addition of 1.5 equivalents of dry lithium chloride. Similar results were observed for the functionalization of poly(isoprenyl) lithium (Examples 3 and 4). The functionalization efficiency increased by greater than 25% when the additive, lithium chloride, was employed.

| Example | Sample | $M_n$ | MWD | Additive | Function |
|---------|--------|-------|-----|----------|----------|
| 1 | PS-Nme$_2$ | $4.0 \times 10^3$ | 1.07 | LiCl | 0.92 |
| 2 | PS-Nme$_2$ | $2.2 \times 10^3$ | 1.05 | None | 0.65 |
| 3 | PI-Nme$_2$ | $3.9 \times 10^3$ | 1.08 | LiCl | 1.02 |
| 4 | PI-Nme$_2$ | $1.8 \times 10^3$ | 1.08 | None | 0.81 |

This invention also provides processes for preparing functionalized polymers. In the processes of the invention, an additive as described above is used to improve the functionalization of polymer anions with electrophiles, including alkyl halide electrophiles. The processes for the anionic polymerization of anionically polymerizable monomers comprise initiating polymerization of a conjugated diene hydrocarbon monomer, a mixture of conjugated diene monomers, an alkenylsubstituted aromatic compound, a mixture of alkenylsubstituted aromatic compounds, or a mixture of one or more conjugated diene hydrocarbons and one or more alkenylsubstituted aromatic compounds in a hydrocarbon or mixed hydrocarbon-polar solvent medium at a temperature of 10° C. to 150° C. with one or more initiators having the formula:

$$R'-Li$$

or $$M-Q_n-Z-T-(A-R^7R^8R^9)_m \quad (I)$$

$$(II)$$

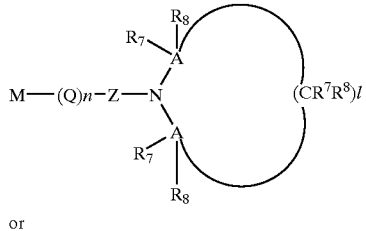

or

-continued

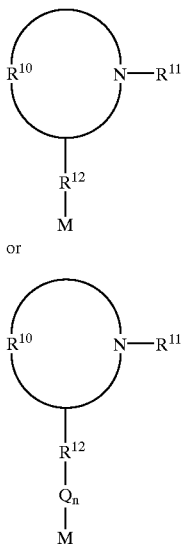

wherein M, Q, Z, A, R', R$^7$, R$^8$, R$^9$, R$^{10}$, R$^{11}$, R$^{12}$, l, m, and n are as defined above to produce an intermediate living polymer. The monomers can be polymerized singly, sequentially or as a mixture thereof.

The intermediate living polymer is then reacted with one or more electrophiles, such as those described above, in the presence of an additive, also as described above. The resultant linear or branched monofunctional, homotelechelic, heterotelechelic, polymer having one or more terminal functional groups can be recovered.

The additive, or mixture of additives, can be added to the reactor at the beginning of the polymerization, as a component of the initiator composition, during the polymerization, after the polymerization but prior to the functionalization, or as a component of the functionalization formulation.

Monomer(s) to be anionically polymerized to form living polymer anions can be selected from any suitable monomer capable of anionic polymerization, including conjugated alkadienes, alkenylsubstituted aromatic hydrocarbons, and mixtures thereof. Examples of suitable conjugated alkadienes include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene.

Examples of polymerizable alkenylsubstituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, incorporated herein by reference in its entirety, discloses suitable additional alkenylsubstituted aromatic compounds.

The inert solvent is preferably a non-polar solvent such as a hydrocarbon, since anionic polymerization in the presence of such non-polar solvents is known to produce polyenes with high 1,4-contents from 1,3-dienes. Inert hydrocarbon solvents useful in practicing this invention include but are not limited to inert liquid alkanes, cycloalkanes and aromatic solvents and mixtures thereof. Exemplary alkanes and cycloalkanes include those containing five to 10 carbon atoms, such as pentane, hexane, cyclohexane, methylcyclohexane, heptane, methylcycloheptane, octane, decane and the like and mixtures thereof. Exemplary aryl solvents include those containing six to ten carbon atoms, such as toluene, ethylbenzene, p-xylene, m-xylene, o-xylene, n-propylbenzene, isopropylbenzene, n-butylbenzene, and the like and mixtures thereof.

Polar modifiers can be added to the polymerization reaction to alter the microstructure of the resulting polymer, i.e., increase the proportion of 1,2 (vinyl) microstructure or to promote functionalization or randomization. Examples of polar modifiers include, but are not limited to: diethyl ether, dibutyl ether, tetrahydrofuran (THF), 2-methyltetrahydrofuran, methyl tert-butyl ether (MTBE), diazabicyclo[2.2.2]octane (DABCO), triethylamine, tri-n-butylamine, N,N,N',N'-tetramethylethylenediamine (TMEDA), and 1,2-dimethoxyethane (glyme). The amount of the polar modifier added depends on the vinyl content desired, the nature of the monomer, the temperature of the polymerization, and the identity of the polar modifier.

The polymers can be optionally hydrogenated. Protecting groups when present on the functionalizing agents and/or initiators can also be optionally removed, prior to or following hydrogenation. Removal of the protecting group(s) (deprotection) produces polymers with at least one functional group (e.g. oxygen, sulfur and/or nitrogen) per polymer chain on the ends of the polymer arms. The functional groups can then participate in various copolymerization reactions by reaction of the functional groups on the ends of the polymer arms with selected difunctional or polyfunctional comonomers.

Deprotection can be performed either prior to or after the optional hydrogenation of the residual unsaturation. For example, to remove tert-alkyl-protected groups, the protected polymer can be mixed with Amberlyst® 15 ion exchange resin and heated at an elevated temperature, for example 150° C., until deprotection is complete. Tert-alkyl-protected groups can also be removed by reaction of the polymer with para-toluensulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, N.Y., 1991, page 41.

Tert-butyldimethylsilyl protecting groups can be removed by treatment of the copolymer with acid, such as hydrochloric acid, acetic acid, para-toluensulfonic acid, or Dowex® 50W-X8. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, N.Y., 1991, pages 80–83.

The progress of the deprotection reactions can be monitored by conventional analytical techniques, such as Thin Layer Chromatography (TLC), Nuclear Magnetic Resonance (NMR) spectroscopy, or InfraRed (IR) spectroscopy.

Hydrogenation techniques are described in U.S. Pat. Nos. 4,970,254, 5,166,277, 5,393,843 and 5,496,898, the entire disclosure of each of which is incorporated by reference. The hydrogenation of the polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction can be conducted until at least 90% of the aliphatic unsaturation has been saturated. The hydrogenated polymer is then recovered by conventional procedures, such as removal of the catalyst with aqueous acid wash, followed by solvent removal or precipitation of the polymer.

The present invention will be further illustrated by the following non-limiting examples.

EXAMPLE 1

Preparation of Dimethylaminopropylpolystyrene

A 250 ml. glass reactor was equipped with two break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with purified benzene (90 ml.). S-butyllithium, 0.149 grams (2.3 mmole, 1.45 M in cyclohexane, 1.6 mL) was then added via syringe. Purified styrene monomer (9.30 grams, 89.3 mmoles) was added from a break-seal ampoule. The reaction mixture was kept for 6 hours at room temperature. The living poly(styryl) lithium was then transferred into an ampoule and the known amount of residual solution was terminated with degassed methanol from the last ampoule to obtain a base polymer sample. A second 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.133 grams, 3.14 mmols) was added to the second reactor and dried by heating at 150° C. for an hour under vacuum. The flask was then allowed to cool to room temperature. The poly(styryl) lithium (90 ml, 2.09 mmols) was transferred to one of the ampoules. The second ampoule was charged with a benzene solution of 3-(N,N-dimethylamino)-1-chloropropane (0.383 grams, 3.14 mmols). The poly(styryl)lithium solution and the solution of 3-(N,N-dimethylamino)-1-chloropropane were added sequentially to the reactor by breaking the corresponding breakseals. The reaction mixture was kept at room temperature for 6 hours with stirring before quenched by addition of degassed methanol from the last break-seal ampoule. The resultant functionalized polymer solution was precipitated into a large amount of methanol and the recovered polymer was air dried for 24 hours.

The resultant base polystyrene polymer was characterized by SEC (polystyrene standards), and had the following properties:

$M_n = 4.0 \times 10^3$ g/mole $M_w/M_n = 1.07$.

End-group titration of the functionalized polymer indicated that the functionality was 0.92.

COMPARATIVE EXAMPLE

Preparation of Dimethylaminopropylpolystyrene, No Additive

A 250 ml. glass reactor was equipped with two break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with purified benzene (75 ml.). S-Butyllithium, 0.251 grams (3.9 mmole, 1.45 M in cyclohexane, 2.7 mL) was then added via syringe. Purified styrene monomer (8.50 grams, 81.6 mmoles) was added from a break-seal ampoule. The reaction mixture was kept for 6 hours at room temperature. The living poly(styryl) lithium was then transferred into an ampoule and the known amount of residual solution was terminated with degassed methanol from the last ampoule to obtain a base polymer sample. A second 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The poly(styryl)lithium (75 ml, 3.7 mmols) was transferred to one of the ampoules. The second ampoule was charged with a benzene solution of 3-(N,N-dimethylamino)-1-chloropropane (0.677 grams, 5.55 mmols). The poly(styryl)lithium solution and the solution of 3-(N,N-dimethylamino)-1-chloropropane were added sequentially to the reactor by breaking the corresponding breakseals. The reaction mixture was kept at room temperature for 6 hours with stirring before quenched by addition of degassed methanol from the last break-seal ampoule. The resultant functionalized polymer solution was precipitated into a large amount of methanol and the recovered polymer was air dried for 24 hours.

The resultant base polystyrene polymer was characterized by SEC (polystyrene standards), and had the following properties:

$M_n = 2.2 \times 10^3$ g/mole $M_w/M_n = 1.05$.

End-group titration of the functionalized polymer indicated that the functionality was 0.65.

EXAMPLE 2

Preparation of Dimethylaminopropylplolyisoprene

A 250 ml. glass reactor was equipped with two break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with purified cyclohexane (90 ml.). S-Butyllithium, 0.149 grams (2.3 mmole, 1.45 M in cyclohexane, 1.6 mL) was then added via syringe. Purified isoprene monomer (9.00 grams, 132.1 mmoles) was added from a break-seal ampoule. The reaction mixture was kept for 6 hours at room temperature. The living poly (isoprenyl)lithium was then transferred into an ampoule and the known amount of residual solution was terminated with degassed methanol from the last ampoule to obtain a base polymer sample. A second 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.133 grams, 3.14 mmols) was added to the second reactor and dried by heating at 150° C. for an hour under vacuum. The flask was then allowed to cool to room temperature. The poly(isoprenyl)lithium (90 ml, 2.09 mmols) was transferred to one of the ampoules. The second ampoule was charged with a cyclohexane solution of 3-(N,N-dimethylamino)-1-chloropropane (0.383 grams, 3.14 mmols). The poly(isoprenyl)lithium solution and the solution of 3-(N,N-dimethylamino)-1-chloropropane were added sequentially to the reactor by breaking the corresponding breakseals. The reaction mixture was kept at room temperature for 6 hours with stirring before quenched by addition of degassed methanol from the last break-seal ampoule. BHT (2,6-di-t-butyl-4-methylphenol, 0.1 wt %) was added to the polymer solution as an antioxidant. The resultant functionalized polymer solution was precipitated into a large amount of methanol and the recovered polymer was air dried for 24 hours.

The resultant base polyisoprene polymer was characterized by SEC (polyisoprene standards), and had the following properties:

$M_n$=3.9×10 g/mole $M_w/M_n$=1.08.

End-group titration of the functionalized polymer indicated that the functionality was 1.02.

COMPARATIVE EXAMPLE

Preparation of Dimethylaminopropylpolyisoprene, No Additive

A 250 ml. glass reactor was equipped with two break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with purified cyclohexane (75 ml.). S-Butyllithium, 0.251 grams (3.9 mmole, 1.45 M in cyclohexane, 2.7 mL) was then added via syringe. Purified isoprene monomer (7.10 grams, 104 mmoles) was added from a break-seal ampoule. The reaction mixture was kept for 6 hours at room temperature. The living poly(isoprenyl)lithium was then transferred into an ampoule and the known amount of residual solution was terminated with degassed methanol from the last ampoule to obtain a base polymer sample. A second 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The poly(isoprenyl)lithium (75 ml, 3.7 mmols) was transferred to one of the ampoules. The second ampoule was charged with a cyclohexane solution of 3-(N,N-dimethylamino)-1-chloropropane (0.677 grams, 5.55 mmols). The poly(isoprenyl)lithium solution and the solution of 3-(N,N-dimethylamino)-1-chloropropane were added sequentially to the reactor by breaking the corresponding breakseals. The reaction mixture was kept at room temperature for 6 hours with stirring before quenched by addition of degassed methanol from the last break-seal ampoule. BHT (2,6-di-t-butyl-4-methylphenol, 0.1 wt %) was added to the polymer solution as an antioxidant. The resultant functionalized polymer solution was precipitated into a large amount of methanol and the recovered polymer was air dried for 24 hours.

The resultant base polyisoprene polymer was characterized by SEC (polyisoprene standards), and had the following properties:

$M_n$=1.8×10$^3$ g/mole $M_w/M_n$=1.08.

End-group titration of the functionalized polymer indicated that the functionality was 0.81.

EXAMPLE 3

Preparation of Alpha-Hydroxy-Omega-Dimethylaminopropylpolystyrene

A 500 ml. glass reactor was equipped with two break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with purified benzene (250 ml.). 3-(1,1-Dimethylethoxy)-1-propyllithium, chain extended with two equivalents of isoprene, 0.90 grams (3.5 mmole, 0.52 M in cyclohexane, 6.7 mL) was then added via syringe. Purified styrene monomer (28.15 grams, 89.3 mmoles) was added from a break-seal ampoule. The reaction mixture was kept for 6 hours at room temperature. The living poly(styryl)lithium was divided equally into three calibrated ampoules for reaction with the alkyl chlorides. The residual solution was terminated with degassed methanol from the last ampoule to obtain a base polymer sample. A second 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.041 grams, 0.97 mmols) was added to the second reactor and dried by heating at 150° C. for an hour under vacuum. The flask was then allowed to cool to room temperature. The poly(styryl)lithium (80 ml, 0.97 mmols) was transferred to one of the ampoules. The second ampoule was charged with a benzene solution of 3-(N,N-dimethylamino)-1-chloropropane (0.18 grams, 1.46 mmoles). The poly(styryl)lithium solution and the solution of 3-(N,N-dimethylamino)-1-chloropropane were added sequentially to the reactor by breaking the corresponding breakseals. The reaction mixture was kept at room temperature for 6 hours with stirring before quenched by addition of degassed methanol from the last break-seal ampoule. The resultant functionalized polymer solution was precipitated into a large amount of methanol and the recovered polymer was air dried for 24 hours.

The resultant base polystyrene polymer was characterized by SEC (polystyrene standards), and had the following properties:

$M_n$=8.3×10$^3$ g/mole $M_w/M_n$=1.22.

Examination of the $^1$H NMR indicated the presence of the t-butyl group from the initiator ($\delta$=1.17 ppm for the —OC(CH$_3$)$_3$) and a dimethylamino group from the electrophile ($\delta$2.20 ppm for the —N(CH$_3$)$_2$).

Removal of tertiary butyl group protecting group was effected by reaction of the alpha, omega heterotelechelic functionalized polymer, prepared above, with Amberlyst-15® in cyclohexane for 6 hours under reflux. The resultant alpha-hydroxyl-omega-dimethylaminopropylpolystyrene polymer was isolated and characterized.

End-group titration of the functionalized polymer indicated that the functionality was 0.98. Examination of the $^1$H NMR of this heterotelechelic polymer indicated a dimethylamino ($\delta$=2.20 ppm for the —N(CH$_3$)$_2$) functionality of 0.91.

EXAMPLE 4

Preparation of Alpha-Hydroxy-Omega-Dimethylethylthiopropylpolystyrene

A 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.041 grams, 0.97 mmols) was added to the reactor and dried by heating at 150° C. for an hour under vacuum. The flask was then allowed to cool to room temperature. The poly(styryl)lithium, prepared in Example 3 above, (80 ml, 0.97 mmols) was transferred to one of the ampoules. The second ampoule was charged with a benzene solution of 3-(dimethylethylthio)-1-chloropropane (0.24 grams, 1.46 mmoles). The poly(styryl) lithium solution and the solution of 3-(dimethylethylthio)-1-chloropropane were added sequentially to the reactor by breaking the corresponding breakseals. The reaction mixture was kept at room temperature for 6 hours with stirring before quenched by addition of degassed methanol from the last break-seal ampoule. The resultant functionalized polymer solution was precipitated into a large amount of methanol and the recovered polymer was air dried for 24 hours.

The resultant base polystyrene polymer was characterized by SEC (polystyrene standards), and had the following properties:

$M_n$=8.3×10$^3$ g/mole $M_w/M_n$=1.22.

Examination of the $^1$H NMR indicated the presence of the t-butyl group from the initiator ($\delta$1.17 ppm for the —OC(CH$_3$)$_3$), and the t-butyl group from the electrophile ($\delta$=1.41 ppm for the —SC(CH$_3$)$_3$).

Removal of tertiary butyl group protecting group was effected by reaction of the alpha, omega heterotelechelic functionalized polymer, prepared above, with Amberlyst-15® in cyclohexane for 6 hours under reflux. The resultant alpha-hydroxyl-omega-dimethylethylthiopropylpolystyrene polymer was isolated and characterized.

End-group titration of the functionalized polymer indicated that the functionality was 0.95.

EXAMPLE 5

Preparation of Alpha-Hydroxy-Omega-Aminopropylpolystyrene

A 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.041 grams, 0.97 mmols) was added to the reactor and dried by heating at 150° C. for an hour under vacuum. The flask was then allowed to cool to room temperature. The poly(styryl)lithium, prepared in Example 3 above, (80 ml, 0.97 mmols) was transferred to one of the ampoules. The second ampoule was charged with a benzene solution of N-3-chloropropyl-2,2,5,5-tetramethyl-2,5-disila-1-azapentane (0.388 grams, 1.46 mmoles). The poly(styryl)lithium solution and the solution of N-3-chloropropyl-2,2,5,5-tetramethyl-2,5-disila-1-azapentane were added sequentially to the reactor by breaking the corresponding breakseals. The reaction mixture was kept at room temperature for 6 hours with stirring. A small sample was withdrawn with a syringe through the sample port for $^1$H NMR analysis. Degassed methanol was then added from the remaining break-seal ampoule. The resultant functionalized polymer solution was precipitated into a large amount of methanol. The silyl protecting group was removed by washing the polymer cement five times with methanol and the recovered polymer was air dried for 24 hours.

The resultant base polystyrene polymer was characterized by SEC (polystyrene standards), and had the following properties:

$M_n$=8.3×10$^3$ g/mole $M_w/M_n$=1.22

Examination of the $^1$H NMR of this heterotelechelic polymer (prior to deprotection) indicated the presence of the t-butyl group from the initiator ($\delta$=1.17 ppm for the —OC(CH$_3$)$_3$) and indicated a silicon protecting group ($\delta$=0.08 ppm for the —Si(CH$_3$)$_2$—) functionality of 0.99.

Removal of tertiary butyl group protecting group was effected by reaction of the alpha, omega heterotelechelic functionalized polymer, prepared above, with Amberlyst-15® in cyclohexane for 6 hours under reflux. The resultant alpha-hydroxyl-omega-aminopropylpolystyrene polymer was isolated and characterized.

End-group titration of the functionalized polymer indicated that the functionality was 1.02.

EXAMPLE 6

Preparation of Alpha-Hydroxy-Omega-Dimethylaminopropylpolyisoprene

A 500 ml. glass reactor was equipped with two break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. The reactor was charged with purified cyclohexane (300 ml.). 3-(1,1-Dimethylethoxy)-1-propyllithium, chain extended with two equivalents of isoprene, 1.81 grams (7.0 mmole, 0.52 M in cyclohexane, 13.5 mL) was then added via syringe. Purified isoprene monomer (23.15 grams, 340 mmoles) was added from a break-seal ampoule. The reaction mixture was kept for 6 hours at room temperature. The living poly(isoprenyl)lithium was divided equally into three calibrated ampoules for reaction with the alkyl chlorides. The residual solution was terminated with degassed methanol from the last ampoule to obtain a base polymer sample. A second 250 ml. glass reactor was equipped with three break-seal reagent ampoules; a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.128 grams, 3.03 mmoles) was added to the second reactor and dried by heating at 150° C. for an hour under vacuum. The flask was then allowed to cool to room temperature. The poly (isoprenyl)lithium (95 ml, 2.02 mmoles) was transferred to one of the ampoules. The second ampoule was charged with a cyclohexane solution of 3-(N,N-dimethylamino)-1-chloropropane (0.37 grams, 3.03 mmoles). The poly (isoprenyl)lithium solution and the solution of 3-(N,N-dimethylamino)-1-chloropropane were added sequentially to the reactor by breaking the corresponding break seals. The reaction mixture was kept at room temperature for 6 hours with stirring before quenched by addition of degassed methanol from the last break-seal ampoule. BHT (2,6-di-t-butyl-4-methylphenol, 0.1 wt %) was added to the polymer solution as an antioxidant. The resultant functionalized polymer solution was precipitated into a large amount of methanol and the recovered polymer was vacuum dried for 24 hours.

The resultant base polyisoprene polymer was characterized by SEC (polyisoprene standards), and had the following properties:

$M_n = 3.2 \times 10^3$ g/mole $M_w/M_n = 1.06$.

Examination of the $^1$H NMR indicated the presence of the t-butyl group from the initiator ($\delta = 1.17$ ppm for the —OC(CH$_3$)$_3$) and a dimethylamino group from the electrophile ($\delta = 2.20$ ppm for the —N(CH$_3$)$_2$).

Removal of tertiary butyl group protecting group was effected by reaction of the alpha, omega heterotelechelic functionalized polymer, prepared above, with Amberlyst-15® in cyclohexane for 6 hours under reflux. The resultant alpha-hydroxyl-omega-dimethylaminopropylpolyisoprene polymer was isolated and characterized.

End-group titration of the functionalized polymer indicated that the functionality was 0.92. Examination of the $^1$H NMR of this heterotelechelic polymer indicated a dimethylamino ($\delta = 2.20$ ppm for the —N(CH$_3$)$_2$) functionality of 0.90.

EXAMPLE 7

Preparation of Alpha-Hydroxy-Omega-Dimethylethylthiopropylpolyisoprene

A 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.128 grams, 3.03 mmoles) was added to the reactor and dried by heating at 150° C. for an hour under vacuum. The flask was then allowed to cool to room temperature. The poly(isoprenyl)lithium, prepared in Example 6 above, (95 ml, 2.02 mmoles) was transferred to one of the ampoules. The second ampoule was charged with a cyclohexane solution of 3-(dimethylethylthio)-1-chloropropane (0.50 grams, 3.03 mmoles). The poly (isoprenyl)lithium solution and the solution of 3-(dimethylethylthio)-1-chloropropane were added sequentially to the reactor by breaking the corresponding break-seals. The reaction mixture was kept at room temperature for 6 hours with stirring before quenched by addition of degassed methanol from the last break-seal ampoule. BHT (2,6-di-t-butyl-4-methylphenol, 0.1 wt %) was added to the polymer solution as an antioxidant. The resultant functionalized polymer solution was precipitated into a large amount of methanol and the recovered polymer was vacuum dried for 24 hours.

The resultant base polyisoprene polymer was characterized by SEC (polyisoprene standards), and had the following properties:

$M_n = 3.2 \times 10^3$ g/mole $M_w/M_n = 1.06$.

Examination of the $^1$H NMR indicated the presence of the t-butyl group from the initiator ($\delta = 1.17$ ppm for the —OC(CH$_3$)$_3$), and the t-butyl group from the electrophile ($\delta = 1.41$ ppm for the —SC(CH$_3$)$_3$).

Removal of tertiary butyl group protecting group was effected by reaction of the alpha, omega heterotelechelic functionalized polymer, prepared above, with Amberlyst-15® in cyclohexane for 6 hours under reflux. The resultant alpha-hydroxyl-omega-dimethylethylthiopropylpolyisoprene polymer was isolated and characterized.

End-group titration of the functionalized polymer indicated that the functionality was 0.96.

EXAMPLE 8

Preparation of Alpha-Hydroxy-Omega-Aminopronpylpolyisoprene

A 250 ml. glass reactor was equipped with three break-seal reagent ampoules, a sampling port attached with a Teflon® stopcock, an inlet tube fitted with a septum cap, and a magnetic stir bar. This reactor was flame sealed to a high vacuum line, and evacuated at 120° C. for 8 hours. The flask was refilled with dry argon, and allowed to cool to room temperature. Lithium chloride (0.128 grams, 3.03 mmoles) was added to the reactor and dried by heating at 150° C. for an hour under vacuum. The flask was then allowed to cool to room temperature. The poly(isoprenyl)lithium, prepared in Example 6 above, (95 ml, 2.02 mmoles) was transferred to one of the ampoules. The second ampoule was charged with a cyclohexane solution of N-3-chloropropyl-2,2,5,5-tetramethyl-2,5-disila-1-azapentane (0.805 grams, 3.03 mmoles). The poly(isoprenyl)lithium solution and the solution of N-3-chloropropyl-2,2,5,5-tetramethyl-2,5-disila-1-azapentane were added sequentially to the reactor by breaking the corresponding breakseals. The reaction mixture was kept at room temperature for 6 hours with stirring. A small sample was withdrawn with a syringe through the sample port for $^1$H NMR analysis. Degassed methanol was then added from the remaining break-seal ampoule. BHT (2,6-di-t-butyl-4-methylphenol, 0.1 wt %) was added to the polymer solution as an antioxidant. The resultant functionalized polymer solution was precipitated into a large amount of methanol. The silyl protecting group was removed by washing the polymer cement five times with methanol and the recovered polymer was vacuum dried for 24 hours.

The resultant base polyisoprene polymer was characterized by SEC (polyisoprene standards), and had the following properties:

$M_n = 3.2 \times 10^3$ g/mole $M_w/M_n = 1.06$.

Examination of the $^1$H NMR of this heterotelechelic polymer (prior to deprotection) indicated the presence of the t-butyl group from the initiator ($\delta = 1.17$ ppm for the —OC(CH$_3$)$_3$) and indicated a silicon protecting group ($\delta = 0.08$ ppm for the —Si(CH$_3$)$_2$—) functionality of 1.02.

Removal of tertiary butyl group protecting group was effected by reaction of the alpha, omega heterotelechelic functionalized polymer, prepared above, with Amberlyst-15® in cyclohexane for 6 hours under reflux. The resultant alpha-hydroxyl-omega-aminopropylpolyisoprene polymer was isolated and characterized.

End-group titration of the functionalized polymer indicated that the functionality was 0.91.

EXAMPLE 9

Preparation of Telechelic Alpha, Omega-Dihydroxy-Polyisoprene

A 1000 ml. glass reactor is equipped with four break-seal reagent ampoules, a sampling port attached with a Teflon® stopcock, an inlet tube fitted with a septum cap, and a magnetic stir bar. This reactor is flame sealed to a high vacuum line, and evacuated at 120° C. for 8 hours. The flask is refilled with dry argon, and is allowed to cool to room temperature. Lithium chloride (0.64 grams, 15 mmoles) is added to the reactor and dried by heating at 150° C. for an hour under vacuum. The flask is then allowed to cool to room temperature. The reactor is charged with purified cyclohexane (500 ml.). S-Butyllithium, 0.64 grams (10 mmoles, 1.45 M in cyclohexane, 6.9 mL) is then added via syringe. 1,3-Diisopropenylbenzene, 7.91 grams (5 mmoles) is added from a break seal ampoule. The reactor is stirred for sixty minutes at room temperature, to form the dilithium initiator. Purified isoprene monomer (100 grams, 1.468 moles) is added from a break-seal ampoule. The reaction mixture is kept for six hours at room temperature. A solution of 3.13 grams (15 mmoles) 3-(t-butyldimetylsilyloxy)-1-chloropropane is added to the reactor by breaking the corresponding breakseal. The reaction mixture is kept at room temperature for six hours with stirring before quenched by addition of degassed methanol from the last break-seal ampoule. BHT (2,6-di-t-butyl-4-methylphenol, 0.1 wt %) is added to the polymer solution as an antioxidant. The resultant homotelechelic functionalized polymer solution is precipitated into a large amount of methanol and the recovered polymer was vacuum dried for 24 hours.

The resultant base polyisoprene polymer is characterized by SEC (polyisoprene standards), and has the following properties:

$M_n = 1.05 \times 10^4$ g/mole $M_w/M_n = 1.06$.

Examination of the $^1$H NMR indicates the presence of the t-butyldimethylsilyl group from the electrophile ($\delta = 0.09$ ppm for the —Si(CH$_3$)$_3$).

Removal of t-butyldimethylsilyl group protecting group is effected by reaction of the alpha, omega homotelechelic functionalized polymer, prepared above, with 1 N HCl in tetrahydrofuran for 6 hours under reflux. The resultant alpha, omega-dihydroxylpolyisoprene polymer is isolated and characterized.

End-group titration of the deprotected, functionalized polymer indicates that the functionality is 1.94.

The foregoing examples are illustrative of the present invention and are not to be construed as limiting thereof. The invention is defined by the following claims, with equivalents of the claims to be included therein.

That which is claimed is:

1. A process for improving the efficiency of the coupling reaction between polymer anions and electrophiles, the process comprising reacting one or more living polymer anions formed from one or more anionically polymerized monomers selected from the group consisting of one or more conjugated diene, one or more alkenylsubstituted aromatic compound, and mixtures of one or more conjugated dienes with one or more alkenylsubstituted aromatic compounds with one or more electrophiles comprising a compound of the formula

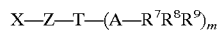

wherein X is halogen selected from the group consisting of chloride, bromide and iodide; Z is a branched or straight chain hydrocarbon connecting group which contains 1–25 carbon atoms, optionally containing aryl or substituted aryl groups; T is selected from the group consisting of oxygen, sulfur, and nitrogen groups and mixtures thereof; $(A-R^7R^8R^9)_m$ is a protecting group in which A is an element selected from Group IVa of the Periodic Table of the Elements, and $R^7$, $R^8$, and $R^9$ are each independently selected from the group consisting of hydrogen, alkyl, substituted alkyl, aryl, substituted aryl, cycloalkyl, and substituted cycloalkyl; m is 1 when T is oxygen or sulfur, and 2 when T is nitrogen; in the presence of an additive capable of increasing the functionalization reaction, said additive γ comprising one or more compounds selected from the group consisting of alkali halides, alkali alkoxides and mixtures thereof.

2. The process of claim 1, wherein said one or more alkali halides are selected from the group consisting lithium chloride, lithium bromide, lithium iodide, sodium chloride, sodium iodide, potassium chloride, and mixtures thereof.

3. The process of claim 1, wherein said one or more alkali alkoxides are selected from the group consisting of lithium t-butoxide, lithium s-butoxide, potassium t-butoxide, and mixtures thereof.

4. The process of claim 1, further comprising prior to said functionalizing step the step of anionically polymerizing one or more of the anionically polymerizable monomers in a hydrocarbon or mixed hydrocarbon-polar solvent medium at a temperature of 10° C. to 150° C. with one or more functionalized or non-functionalized initiators to form one or more living polymer anions.

* * * * *